(12) United States Patent
Perkins et al.

(10) Patent No.: US 11,590,872 B2
(45) Date of Patent: Feb. 28, 2023

(54) POLYHEDRAL BODY OF AN ARTICULATION ASSEMBLY FOR A VEHICLE SEAT

(71) Applicant: Ford Global Technologies, LLC, Dearborn, MI (US)

(72) Inventors: Alexander Perkins, Detroit, MI (US); Ireneusz Trybula, South Lyon, MI (US); Patrick Maloney, Livonia, MI (US); Siddharthan Selvasekar, Livermore, CA (US); Chaitanya Nimmagadda, Ypsilanti, MI (US); Victoria Leigh Schein, Dearborn, MI (US); Sangram Tamhankar, Canton, MI (US); Vishal Vinayak Nageshkar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 17/245,677

(22) Filed: Apr. 30, 2021

(65) Prior Publication Data

US 2022/0348125 A1    Nov. 3, 2022

(51) Int. Cl.
| | |
|---|---|
| *B60N 2/90* | (2018.01) |
| *B60N 2/02* | (2006.01) |
| *B60N 2/52* | (2006.01) |
| *B60N 2/70* | (2006.01) |
| *B60N 2/66* | (2006.01) |

(52) U.S. Cl.
CPC .......... *B60N 2/914* (2018.02); *B60N 2/0244* (2013.01); *B60N 2/52* (2013.01); *B60N 2/665* (2015.04); *B60N 2/7082* (2013.01)

(58) Field of Classification Search
CPC .......... B60N 2/914; B60N 2/665; B60N 2/52; B60N 2/7082
See application file for complete search history.

(56) References Cited

U.S. PATENT DOCUMENTS

| | | | |
|---|---|---|---|
| 7,717,520 B2 | 5/2010 | Boren et al. | |
| 8,162,398 B2 * | 4/2012 | Colja ................... | A61H 9/0078 297/284.6 |
| 8,678,500 B2 | 3/2014 | Lem et al. | |
| 8,746,792 B2 | 6/2014 | Ruthinowski et al. | |

(Continued)

FOREIGN PATENT DOCUMENTS

| | | |
|---|---|---|
| DE | 102013218223 A1 | 2/2015 |
| DE | 102015216945 A1 | 3/2017 |

(Continued)

*Primary Examiner* — Syed A Islam
(74) *Attorney, Agent, or Firm* — Vichit Chea; Price Heneveld LLP

(57) ABSTRACT

An articulation assembly for a vehicle seat includes a planar engagement surface. An inflatable member is operably coupled to the planar engagement surface. The inflatable member includes a plurality of polyhedral bodies that are configured to be formed via additive manufacturing. Each of the polyhedral bodies has a foldable portion that defines crease lines. A plurality of elastomeric members are disposed on each crease line. A planar base includes a port fluidly coupled to the polyhedral bodies. A manifold is fluidly coupled to the port of the planar base and is configured to translate fluid through the port to the polyhedral bodies.

19 Claims, 12 Drawing Sheets

(56) References Cited

U.S. PATENT DOCUMENTS

| | | |
|---|---|---|
| 9,211,824 B2 | 12/2015 | Arant et al. |
| 9,333,889 B1 | 5/2016 | Cloutier |
| 9,346,385 B2 | 5/2016 | Sachs et al. |
| 9,545,860 B2 | 1/2017 | Bocsanyi |
| 9,937,826 B2 | 4/2018 | Dry |
| 10,343,565 B2 | 7/2019 | Baek et al. |
| 10,357,955 B2 | 7/2019 | Ziolek |
| 10,471,874 B2 | 11/2019 | Lem et al. |
| 11,052,794 B2 * | 7/2021 | Hunsaker ............... B60N 2/914 |

FOREIGN PATENT DOCUMENTS

| | | |
|---|---|---|
| DE | 102018119660 A1 | 2/2019 |
| DE | 102019004009 A1 | 12/2020 |
| EP | 2441338 B1 | 12/2017 |
| WO | 2015022331 A1 | 2/2015 |

* cited by examiner

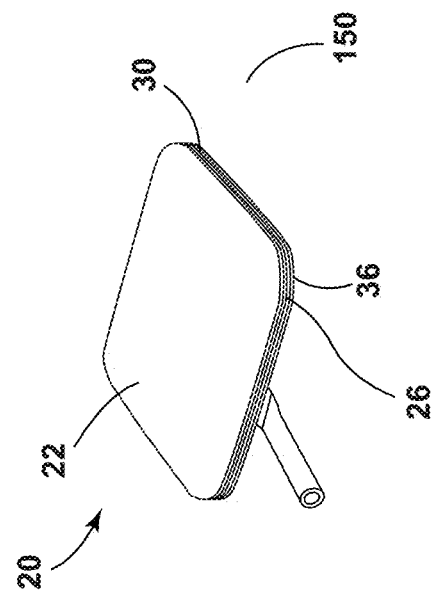
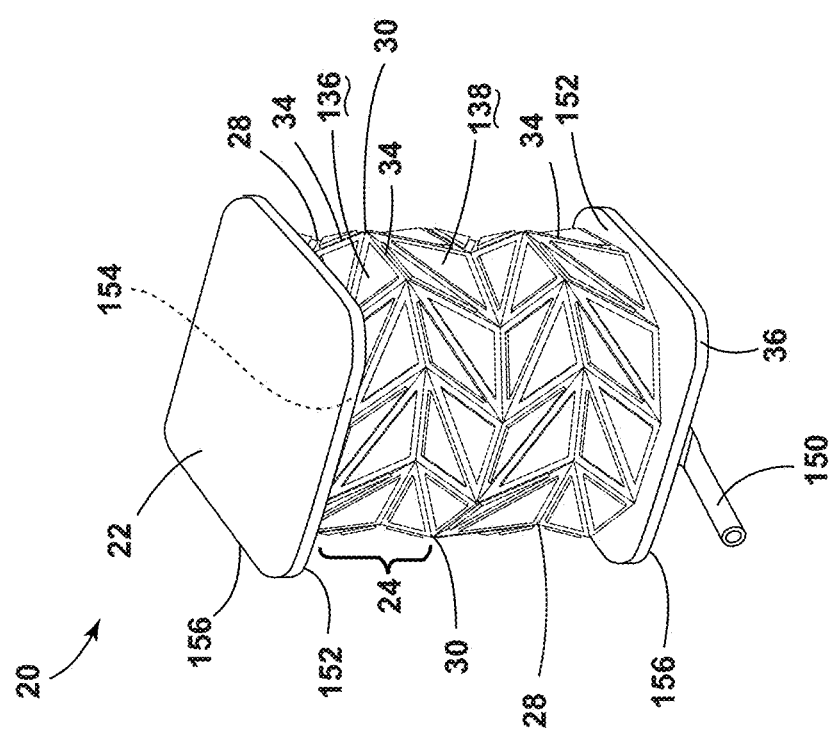

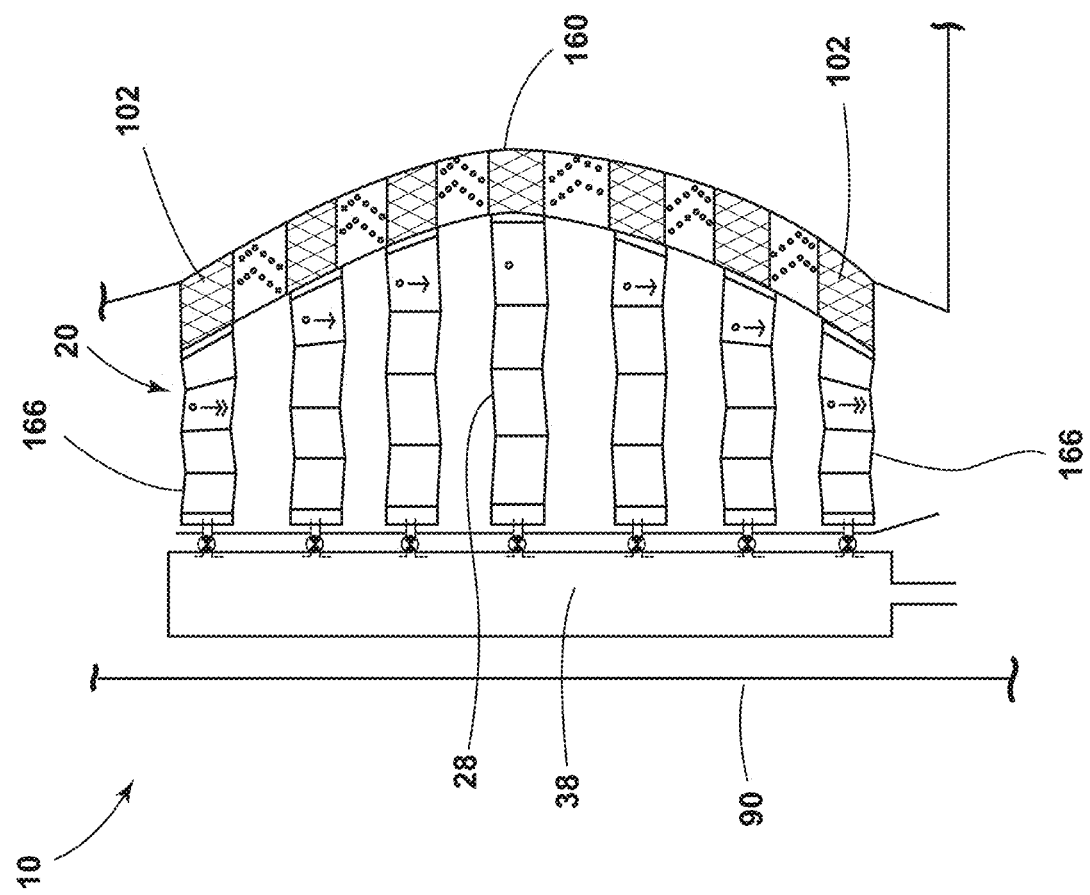

POLYHEDRAL BODY OF AN ARTICULATION ASSEMBLY FOR A VEHICLE SEAT

FIELD OF THE DISCLOSURE

The present disclosure generally relates to an articulation assembly for a vehicle seat. More specifically, the present disclosure generally relates to a polyhedral body of an articulation assembly for a vehicle seat.

BACKGROUND OF THE DISCLOSURE

Vehicles typically include seats that have various features. Some vehicle seats include multi-layered bladders disposed within the seats. The multi-layered bladders may bulge or be otherwise rounded within the seat upon deployment.

SUMMARY OF THE DISCLOSURE

According to a first aspect of the present disclosure, a seating assembly for a vehicle includes a seat frame. An outer shell is coupled to the seat frame and defines a space therebetween. An articulation assembly is disposed within the space defined between the seat frame and the outer shell. The articulation assembly includes a planar engagement surface that is selectively engaged with the outer shell. At least one polyhedral body is operably coupled to the planar engagement surface and is operable between a compressed condition and an extended condition. The polyhedral body includes a plurality of foldable portions that define crease lines. A plurality of elastomeric members are disposed along the crease lines defined by each of the plurality of foldable portions and a planar base is operably coupled to the polyhedral body. A manifold is coupled to the planar base and is configured to translate a fluid to the polyhedral body.

Embodiments of the first aspect of the disclosure can include any one or a combination of the following features:
  the plurality of foldable portions each include a first surface and a second surface;
  the first surface is selectively coupled to the second surface in the compressed condition of the polyhedral body;
  the at least one polyhedral body is configured to be formed via additive manufacturing;
  a controller is communicatively and operably coupled to the articulation assembly via the manifold;
  the controller is configured to activate and deactivate the articulation assembly;
  the plurality of foldable portions include a first foldable portion and a second foldable portion;
  the first foldable portion is selectively coupled to the second foldable portion in the compressed condition of the polyhedral body;
  the articulation assembly further includes an inflatable member comprised of the polyhedral body;
  the inflatable member includes a first end and a second end;
  the first end of the inflatable member is adjacent the second end in the compressed condition; and/or
  the inflatable member is substantially flat in the compressed condition.

According to a second aspect of the present disclosure, an articulation assembly for a vehicle seat includes a planar engagement surface. An inflatable member is operably coupled to the planar engagement surface. The inflatable member includes a plurality of polyhedral bodies that have a foldable portion that defines crease lines. A plurality of elastomeric members are disposed on each of the crease lines. A planar base includes a port fluidly coupled to the polyhedral bodies. A manifold is fluidly coupled to the port of the planar base and is configured to translate fluid through the port to the polyhedral bodies.

Embodiments of the second aspect of the disclosure can include any one or a combination of the following features:
  the polyhedral bodies are configured to translate between a compressed condition and an extended condition;
  the manifold is operably coupled to the polyhedral bodies via the port of the planar base;
  the fluid that is translated by the manifold is configured to translate the polyhedral bodies from the compressed condition to the extended position;
  the foldable portion of each of the polyhedral bodies includes a first surface and a second surface;
  the first surface is selectively coupled to the second surface in the compressed condition of the polyhedral bodies;
  an intermediate condition is defined between the compressed condition and the extended condition;
  the first surface is adjacent to the second surface in the intermediate condition to define an acute angle between the first surface and the second surface; and/or
  the inflatable member is configured to be formed via additive manufacturing.

According to a third aspect of the present disclosure, a vehicle seat assembly includes a seat base. A shell is coupled to the seat base and defines a space between the seat base and the shell. A planar engagement surface is selectively coupled with the shell. A polyhedral body has a first end and a second end that is operably coupled to the planar engagement surface on the first end. The polyhedral body defines a cavity and has a plurality of foldable portions. Each of the plurality of foldable portions includes a first surface and a second surface that is defined by a plurality of crease lines. A planar base is operably coupled to the second end of the polyhedral body and includes a port that is configured to translate the polyhedral body between a compressed condition and an extended condition.

Embodiments of the third aspect of the disclosure can include any one or a combination of the following features:
  an inflatable member includes the polyhedral body and further defines the cavity of the polyhedral body;
  a manifold is fluidly coupled to the port of the planar base and is configured to translate a fluid to the inflatable member via the port to translate the polyhedral body between the compressed condition and the extended condition;
  the polyhedral body includes a plurality of elastomeric members that are operably coupled to the plurality of crease lines of each of the plurality of foldable portions;
  the first surface of a first foldable portion is selectively coupled to the second surface of the first foldable portion in the compressed condition of the polyhedral body;
  the first surface and the second surface of each of the plurality of foldable portions define a living hinge that is operable between the compressed condition and the extended condition of the polyhedral body;
  the first surface and the second surface of each of the plurality of foldable portions each comprise a triangular shape; and/or
  the polyhedral body comprises an origami structure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12A is a side perspective view of an articulation assembly of the present disclosure in an extended condition and with elastomeric members;

FIG. 12B is a side perspective view of the articulation assembly of FIG. 12A in a compressed condition;

FIG. 14 is a schematic view of a plurality of polyhedral bodies of the present disclosure operably coupled to a trim article.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
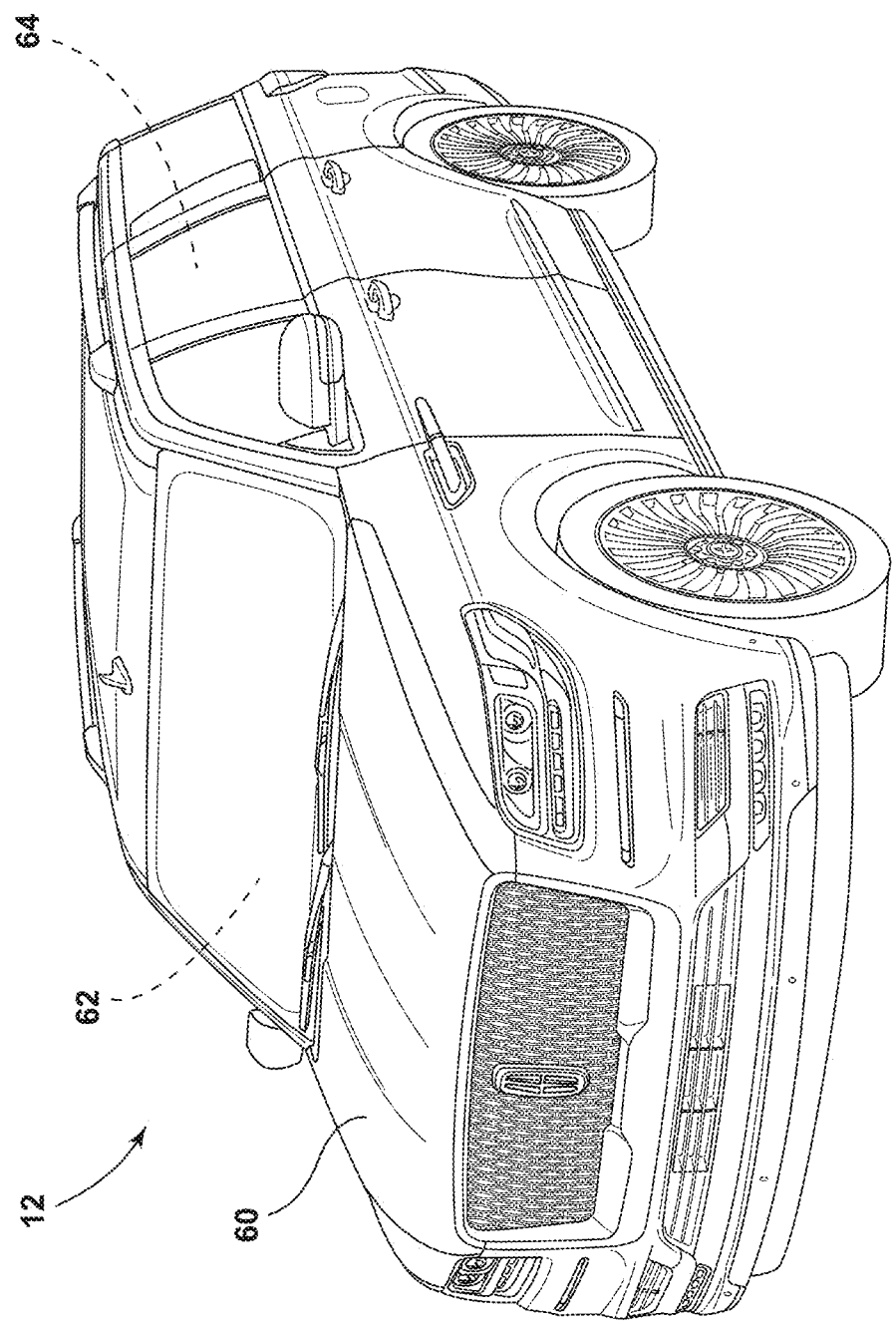
FIG. 1 is a front perspective view of a vehicle of the present disclosure.
Figure 2:
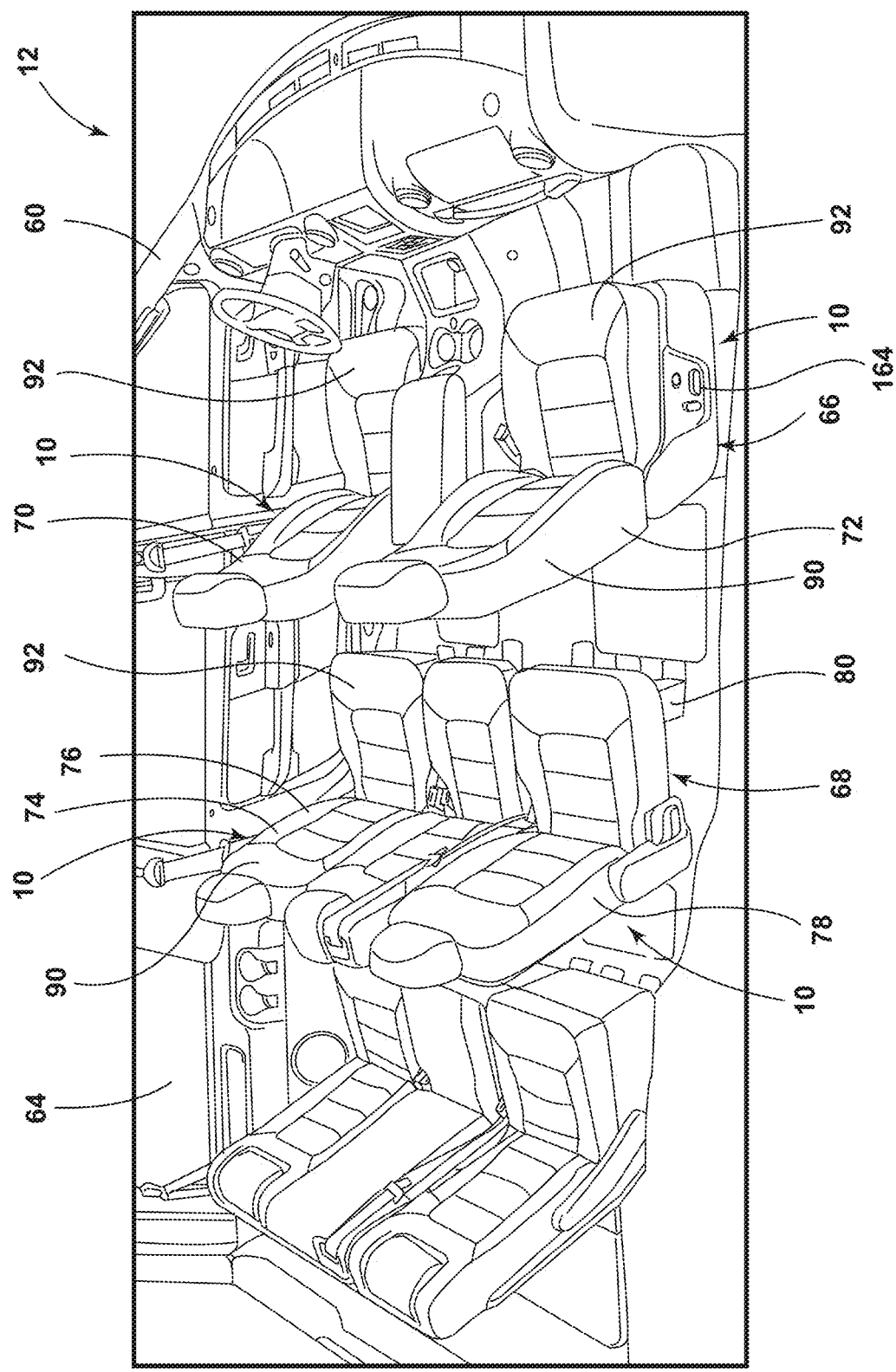
FIG. 2 is a partial top perspective view of a passenger compartment of the vehicle of FIG. 1 with a plurality of seating assemblies of the present disclosure.
Figure 3:
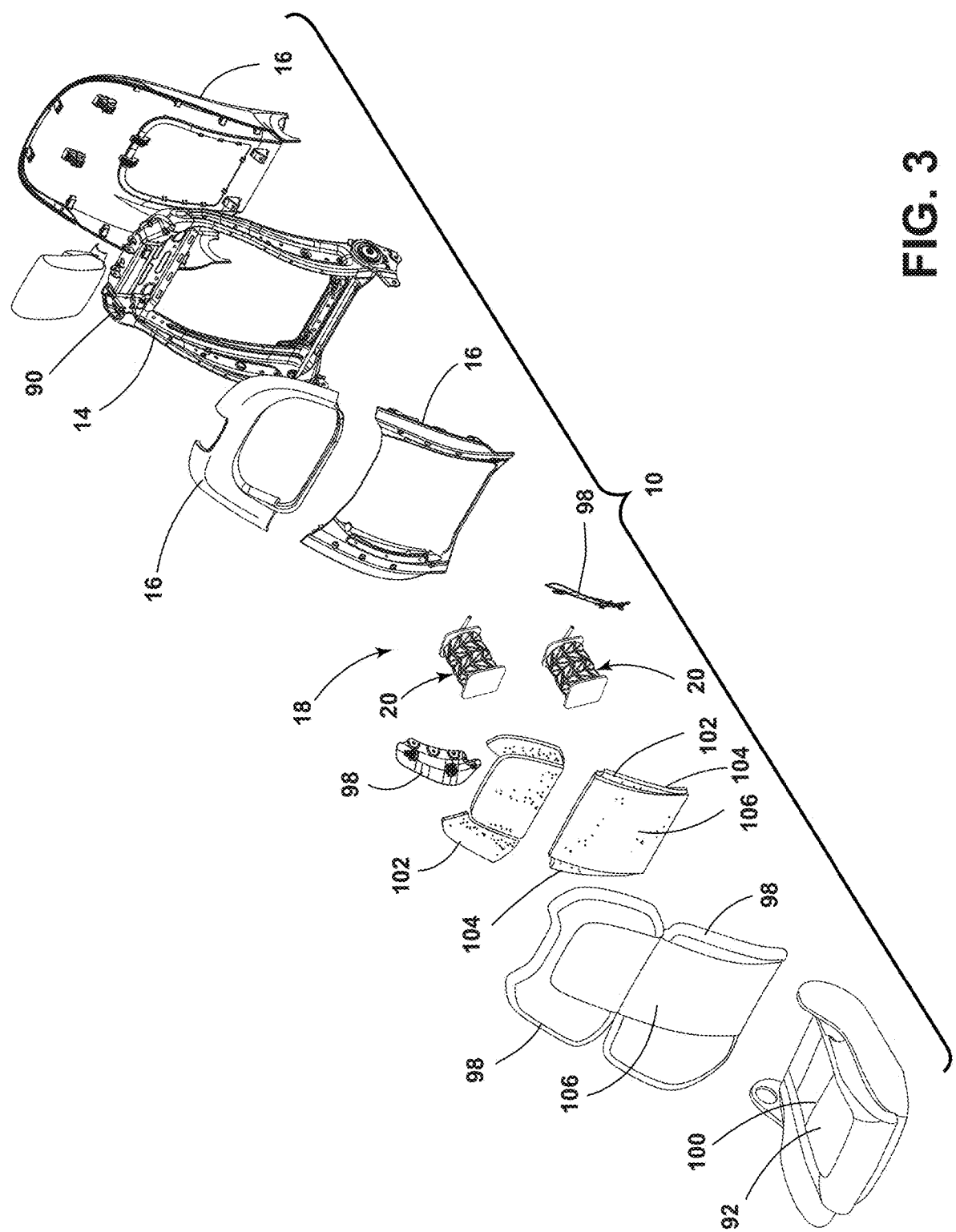
FIG. 3 is an exploded top perspective view of a seating assembly of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-15, reference number 10 generally refers to a seating assembly for a vehicle 12 includes a seat frame 14 and an outer shell 16 coupled to the seat frame 14 and defining a space 18 therebetween. An articulation assembly 20 is configured to be formed via additive manufacturing. The articulation assembly 20 is disposed within the space 18 defined between the seat frame 14 and the outer shell 16. The articulation assembly 20 includes a planar engagement surface 22 that is selectively engaged with the outer shell 16. At least one polyhedral body 24 is operably coupled to the planar engagement surface 22 and is operable between a compressed condition 26 and an extended condition 28. The polyhedral body 24 includes a plurality of foldable portions 30 that define crease lines 32. A plurality of elastomeric members 34 are disposed along the crease lines 32 defined by each of the plurality of foldable portions 30. A planar base 36 is operably coupled to the polyhedral body 24, and a manifold 38 is coupled to the planar base 36 and configured to translate a fluid to the polyhedral body 24.

Referring to FIGS. 1-4, the vehicle 12 includes a vehicle body 60, which defines an interior 62 of the vehicle 12 having a passenger compartment 64 therein. The passenger compartment 64 may include a first seating row 66 and a second seating row 68. Fewer or more seating rows may be included in the vehicle 12 without departing from the teachings herein. The first seating row 66 may include a driver seat 70 and a passenger seat 72, and the second seating row 68 may include a rear passenger seat 74. The rear passenger seat 74 of the second seating row 68 may include bucket seating or may be bench seating. As illustrated, the rear passenger seat 74 includes a first passenger seat 76 and a second passenger seat 78. Each of the driver seat 70, the passenger seat 72, and the rear passenger seat 74 are operably coupled to a rail assembly 80. Each of the seats 70, 72, 74 are configured to translate along the rail assembly 80.

In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services. It is contemplated that the seat assembly 10 may be configured to rotate within the passenger compartment 64 between forward-facing and rearward-facing configurations. As such, it is contemplated that the vehicle 12 may be an autonomous or self-driving vehicle, in which a seat assembly having forward-facing and rearward-facing capabilities could be used.

Referring now to FIGS. 2-5, the seating assembly 10 includes a seatback 90 and a seat base 92 each operably coupled to the seat frame 14. The seatback 90 has an upper support portion 94 and a lower support portion 96. As mentioned above, the outer shell 16 is operably coupled to the seat frame 14 to define the space 18 therebetween. The space 18 is defined between the upper support portion 94 and the lower support portion 96 of the seatback 90 and the seat frame 14, such that the outer shell 16 is generally disposed over and at least partially defining the upper and lower support portions 94, 96. The seatback 90 can define bolsters 98 that are integrally formed with the seatback 90 and outwardly extend from a central portion 100 proximate to the lower support portion 96.

The seat base 92 may also include the bolsters 98, which outwardly extend from the central portion 100 of the seat base 92. The bolsters 98 may be at least partially formed from a trim article 102, such that lateral portions 104 of the trim articles 102 may be generally raised relative to a center 106 of the trim article 102. It is generally contemplated that the trim article 102 may be formed from a foam pad. Additionally or alternatively, the trim article 102 may be formed from a malleable or otherwise moldable body configured to support a user relative to the seating assembly 10, described further below.

With further reference to FIGS. 2-5, the articulation assembly 20 may be disposed within the space 18 proximate to the trim articles 102 in either of the seatback 90 or the seat base 92 of the seating assembly 10. As described herein, the articulation assembly 20 is described with reference to the seatback 90, such that the articulation assembly 20 may be disposed proximate to the trim articles 102 of the seatback 90 within the space 18. As mentioned above, the outer shell 16 may be disposed over the trim articles 102 to couple the trim articles 102 to the seat frame 14. The planar engagement surface 22 of the articulation assembly 20 may be operably coupled to or otherwise engaged with the trim articles 102. Additionally or alternatively, it is contemplated that the articulation assembly 20 may be integrally formed with or otherwise disposed within the trim articles 102.

The trim articles 102 discussed herein are contemplated to be comprised of a single material used in an additive manufacturing process to form the individual trim articles 102 into monolithic structures. In this way, the trim articles 102 of the present concept include fully integrated features comprised of a common material that define overall monolithic structures. As used herein, the term "integrated" refers to component parts of a unitary whole that are formed together to provide the monolithic structure of the overall article. As used herein, the term "monolithic structure" is used to describe a structure that is formed of a single or common material provided in a forming process, such as an additive manufacturing technique. Additive manufacturing techniques contemplated for use with the present concept may include 3D printing, laser sintering and other known additive manufacturing techniques.

Figure 4:
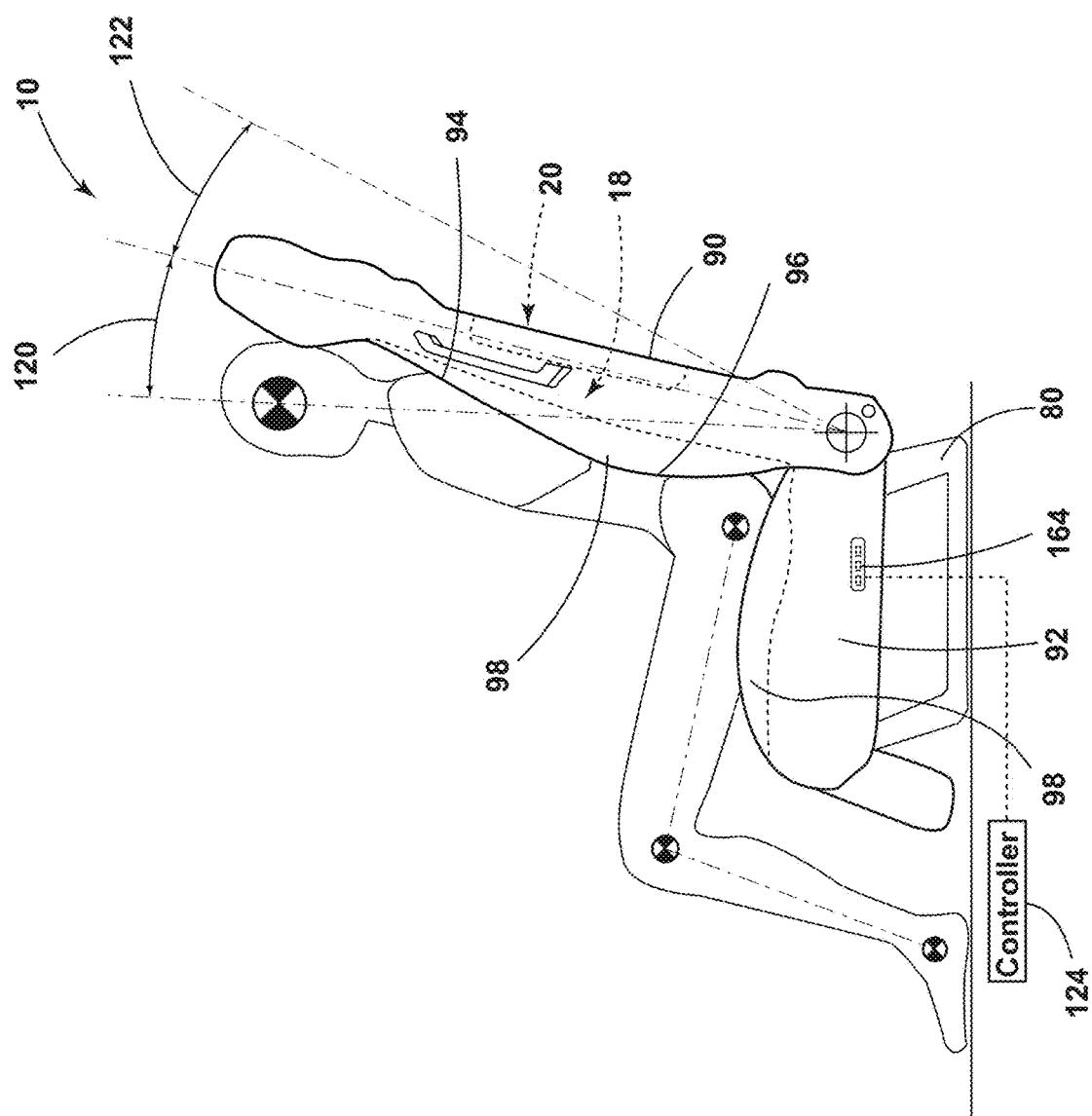
FIG. 4 is a side elevational view of a seating assembly of the present disclosure in an upright position and communicatively coupled to a controller.
Figure 5:
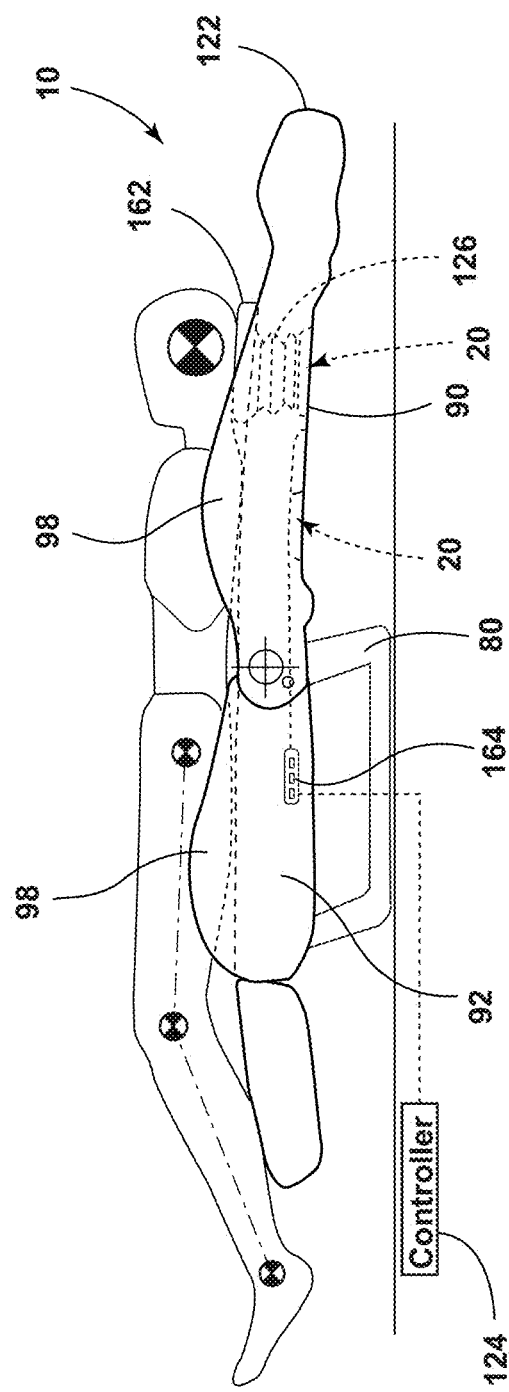
FIG. 5 is a side elevational view of the seating assembly of FIG. 4 in a reclined position.

Referring still to FIGS. 2-5, the articulation assembly 20 may be integrally formed with the trim articles 102, such that the articulation assembly 20 may be formed via additive manufacturing with the trim article 102, as described further below. The articulation assembly 20 may be activated between the compressed condition 26 and the extended condition 28 in varying positions of at least one of the driver seat 70, the passenger seat 72, and/or the rear passenger seats 74. For example, the passenger seat 72 is illustrated in FIGS. 4 and 5 in an upright position 120 and a reclined position 122, respectively. The passenger seat 72 is operably coupled to a controller 124 to selectively adjust the position of the passenger seat 72 between the upright position 120 and the reclined position 122 and various positions therebetween. The controller 124 is also communicatively coupled to the articulation assembly 20 via the manifold 38 to activate and/or deactivate the articulation assembly 20, described further below.

With reference now to FIGS. 6-11 and as mentioned above, the articulation assembly 20 includes the polyhedral body 24 that may also be defined as being isogonal. Stated differently, the polyhedral body 24 of the articulation assembly 20 may have a three-dimensional shape with generally flat, polygon faces, described below, defined by straight edges. FIGS. 6-11 illustrate various configurations of the polyhedral bodies 24 that are contemplated for use with the articulation assembly 20. Each of the depicted polyhedral bodies 24 include at least the plurality of foldable portions 30, which comprise the polygon faces mentioned above. It is generally contemplated that the polyhedral body 24 may include a plurality of polyhedral bodies 24 that are integrally formed to define an inflatable member 126 of the articulation assembly 20. In addition, the plurality of foldable portions 30 may include, at least, a first foldable portion 30a and a second foldable portion 30b, such that the first foldable portion 30a is selectively coupled to the second foldable portion 30b in the compressed condition 26 of the polyhedral body 24. The inflatable member 126 includes a first end 128 and a second end 130. It is generally contemplated that the first end 128 of the inflatable member 126 is coupled to the planar engagement surface 22, and the second end 130 of the inflatable member 126 is coupled to the planar base 36.

Figure 7:
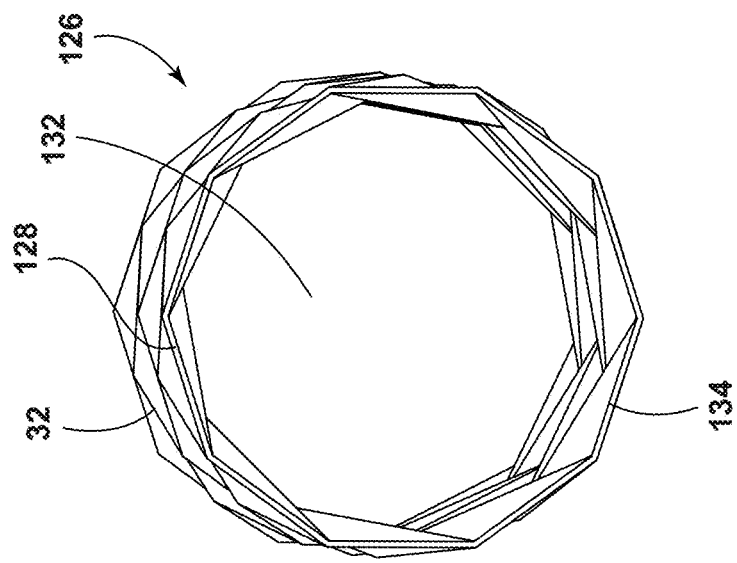
FIG. 7 is a top plan view of the inflatable member of FIG. 6 with a decahedron configuration.
Figure 6:
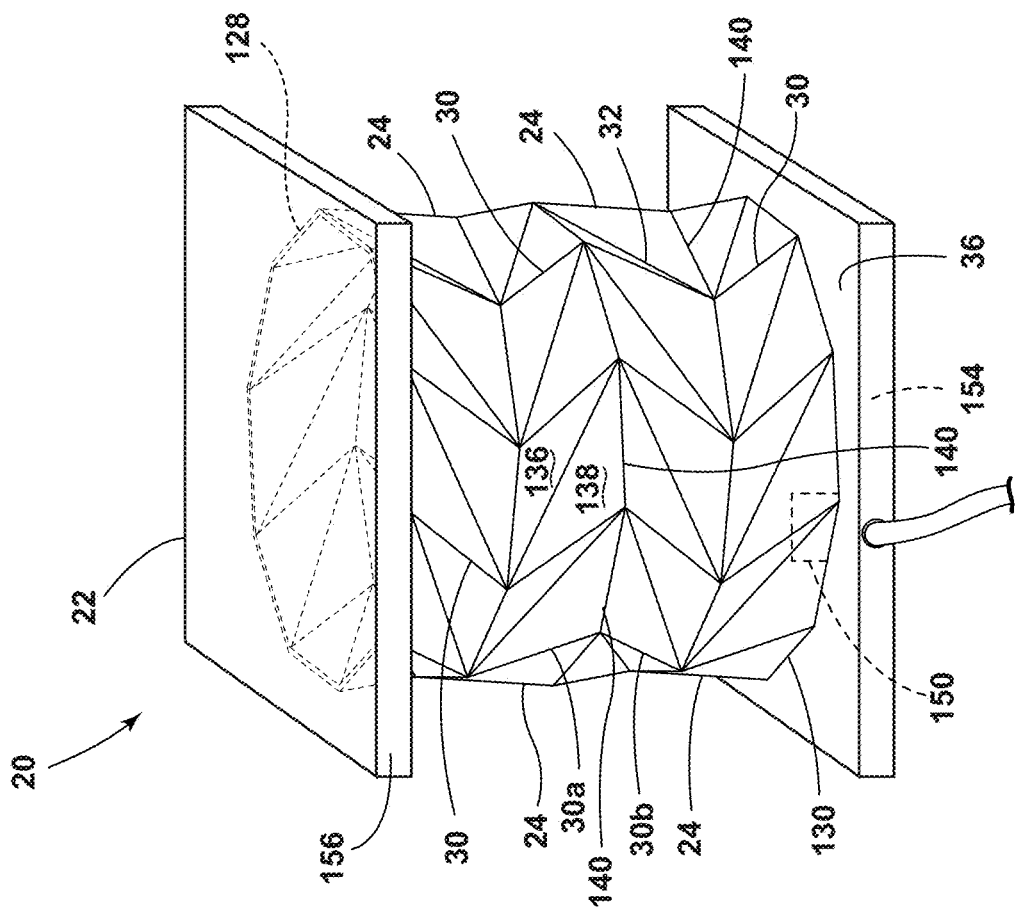
FIG. 6 is a side perspective view of an articulation assembly of the present disclosure including an inflatable member.

With specific reference to FIGS. 6 and 7, the polyhedral body 24 is illustrated as a decahedron, such that the first end 128 and the second end 130 of the inflatable member 126 include edges 134 defined along each of the first and second ends 128, 130. The plurality of foldable portions 30, defined by the polyhedral bodies 24 of the inflatable member 126 illustrated in FIGS. 6 and 7, are defined by obtuse triangles. The configuration of the plurality of foldable portions 30 is such that the foldable portions 30 each include a first surface 136 and a second surface 138. The first and second surfaces 136, 138 are selectively coupled in the compressed condition 26 of the inflatable member 126. Stated differently, the first end 128 of the inflatable member 126 is adjacent to the second end 130 in the compressed condition 26. As mentioned above, each of the plurality of foldable portions 30 define the crease lines 32 that further define the first and second surfaces 136, 138 of each of the foldable portions 30. It is generally contemplated that each of the foldable portions 30 define a living hinge 140 that is operable between the compressed condition 26 and the extended condition 28 of the polyhedral body 24. The living hinge 140 may be defined between the first and second surfaces 136, 138. Additionally or alternatively, each of the crease lines 32 may define the living hinge 140.

The first surface 136 and the second surface 138 each define an obtuse triangle, as mentioned above, such that the triangle defined by the first surface 136 is a mirror-image of the triangle defined by the second surface 138. The first and second surfaces 136, 138 are configured to align when the inflatable member 126 is translated from the extended condition 28 to the compressed condition 26. The first surface 136 is configured to generally fold to be selectively coupled to the second surface 138. It is generally contemplated that the first surface 136 of each of the plurality of foldable portions 30 proximate to the first end 128 of the inflatable member 126 at least partially define one of the edges 134 of the first end 128. By way of example, not limitation, the plurality of foldable portions 30 that at least partially define the first end 128 of the inflatable member 126 also define a single polyhedral body 24 of the articulation assembly 20. It is generally contemplated that in the configuration illustrated in FIGS. 6 and 7, each polyhedral body 24 is formed from the foldable portions 30. As further illustrated in FIG. 6, the inflatable member 126 is defined by four polyhedral bodies 24 integrally formed to define the inflatable member 126.

Figure 9:
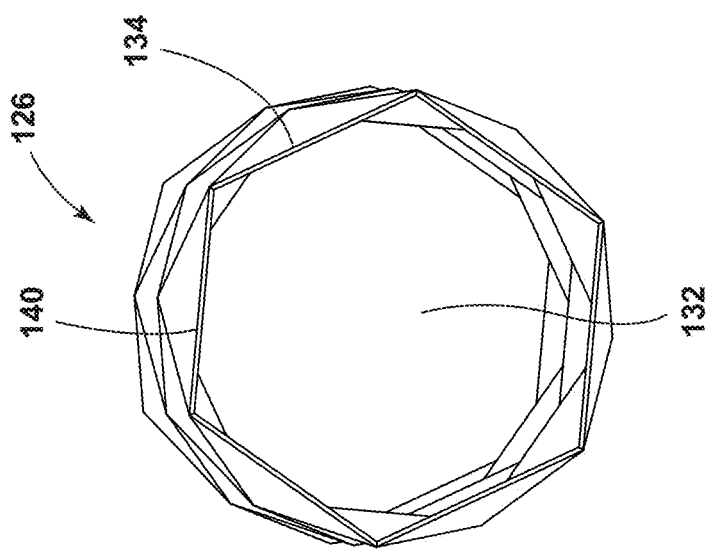
FIG. 9 is a top plan view of the inflatable member of FIG. 8 with a hexahedron configuration.
Figure 8:
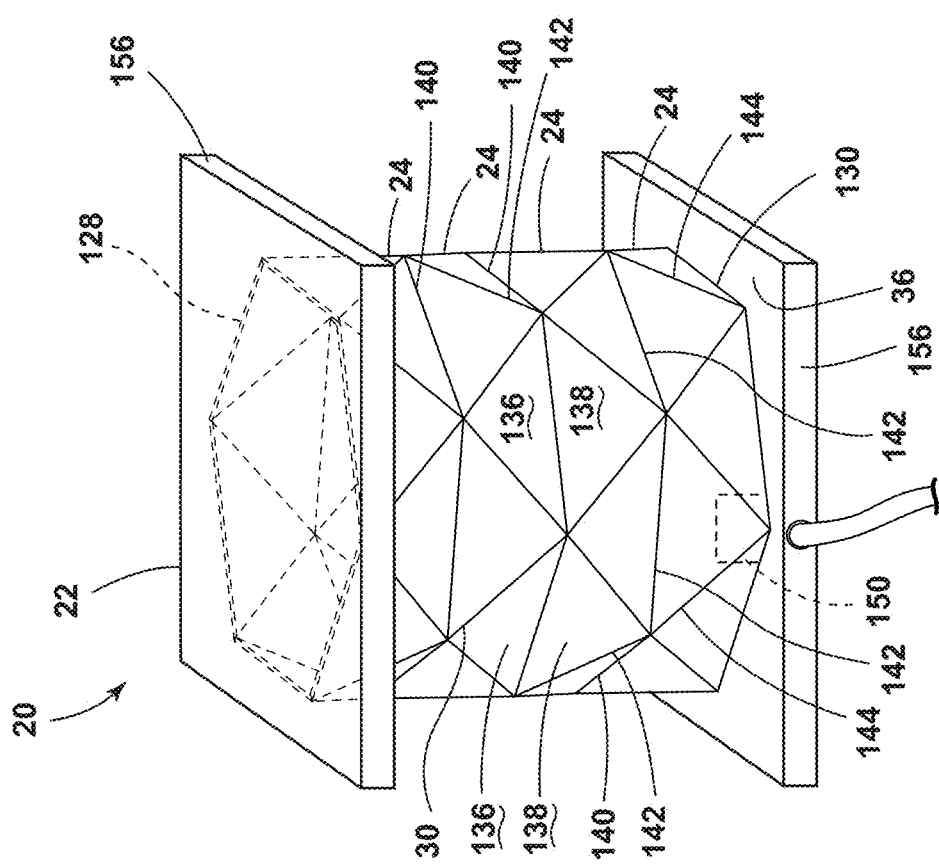
FIG. 8 is a side perspective view of an articulation assembly of the present disclosure including an inflatable member.

With specific reference to FIGS. 8 and 9, an alternate configuration of the inflatable member 126 the polyhedral bodies 24 is illustrated as a hexahedron. The plurality of foldable portions 30 also include triangular first and second surfaces 136, 138. The triangular first and second surfaces 136, 138 generally define a rhombus shape for each of the plurality of foldable portions 30. As illustrated in FIGS. 8 and 9, each of the first and second surfaces 136, 138 include a base edge 142 that defines the edges 134 of the inflatable member 126. Each of the first and second surfaces 136, 138 also include side portions 144 that are coupled to the base edges 142. It is generally contemplated that the base edges 142 and the side portions 144 generally correspond to the crease lines 32 mentioned above as being defined by the foldable portions 30.

The edges 134 of the inflatable member 126 is defined by the base edges 142 of either of the first and second surfaces 136, 138. By way of example, not limitation, the edges 134 of first end 128 of the inflatable member 126 are defined by the base edges 142 of the second surface 138, and the edges 134 of the second end 130 of the inflatable member 126 are defined by the base edges 142 of the first surface 136. It is also contemplated that the base edges 142 of the first surface 136 may define the edges 134 of the first end 128 of the inflatable member 126, and the base edges 142 of the second surface 138 may define the edges 134 of the second end 130 of the inflatable member 126. The base edges 142 generally correspond with and further define the living hinges 140 of the foldable portions 30. Stated differently, the living hinge 140 of each foldable portion 30 may be defined by the base edge 142 of the first and second surfaces 136, 138.

Figure 11:
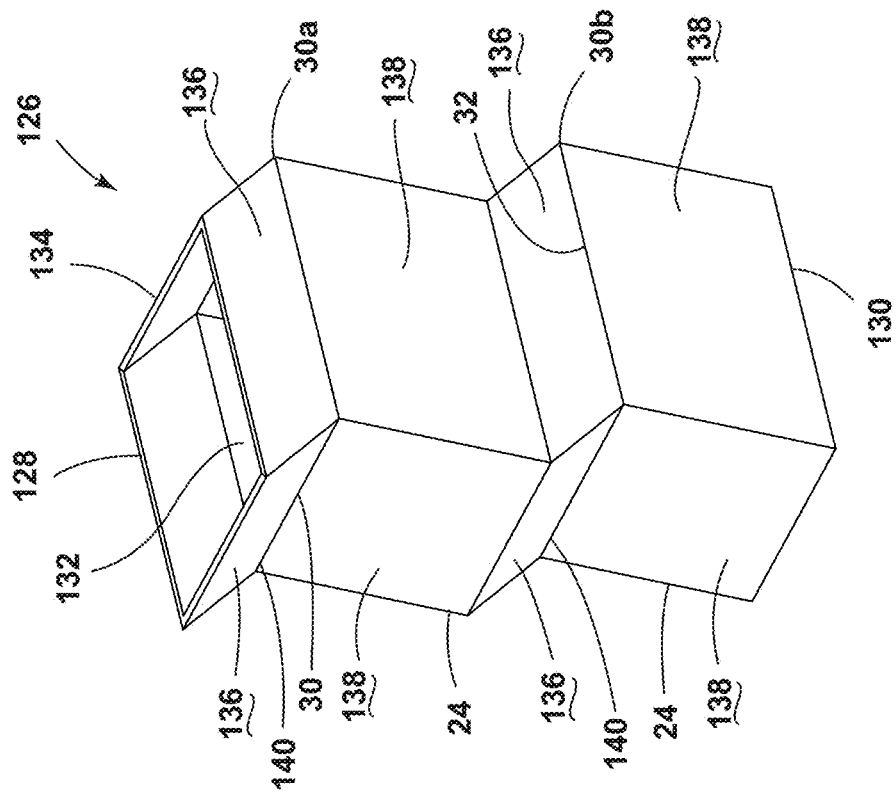
FIG. 11 is a second side perspective view of the inflatable member of FIG. 10.
Figure 10:
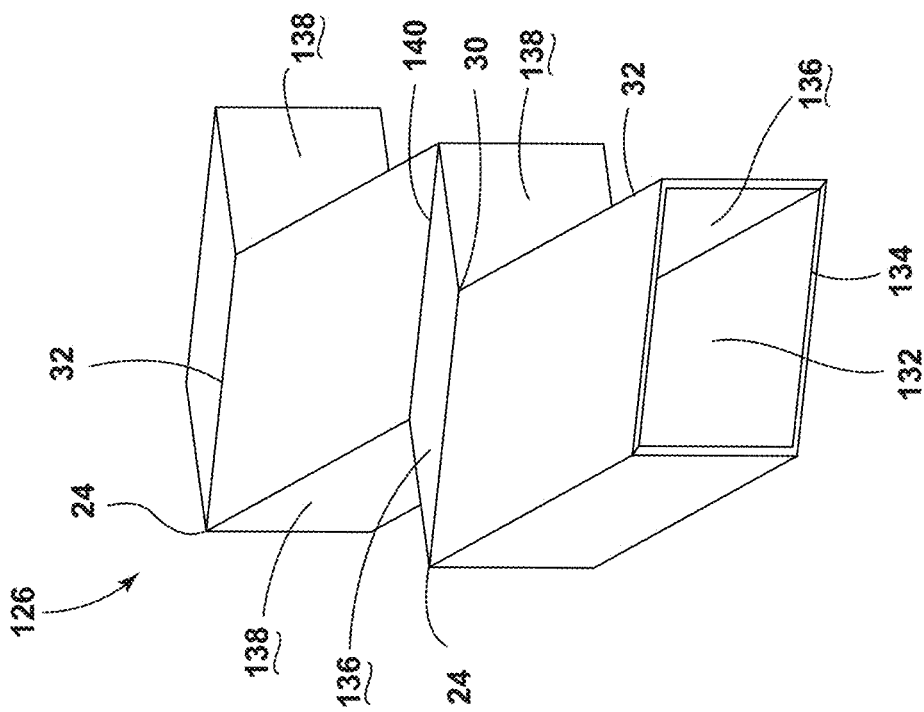
FIG. 10 is a first side perspective view of an inflatable member of the present disclosure.
Figure 13B:
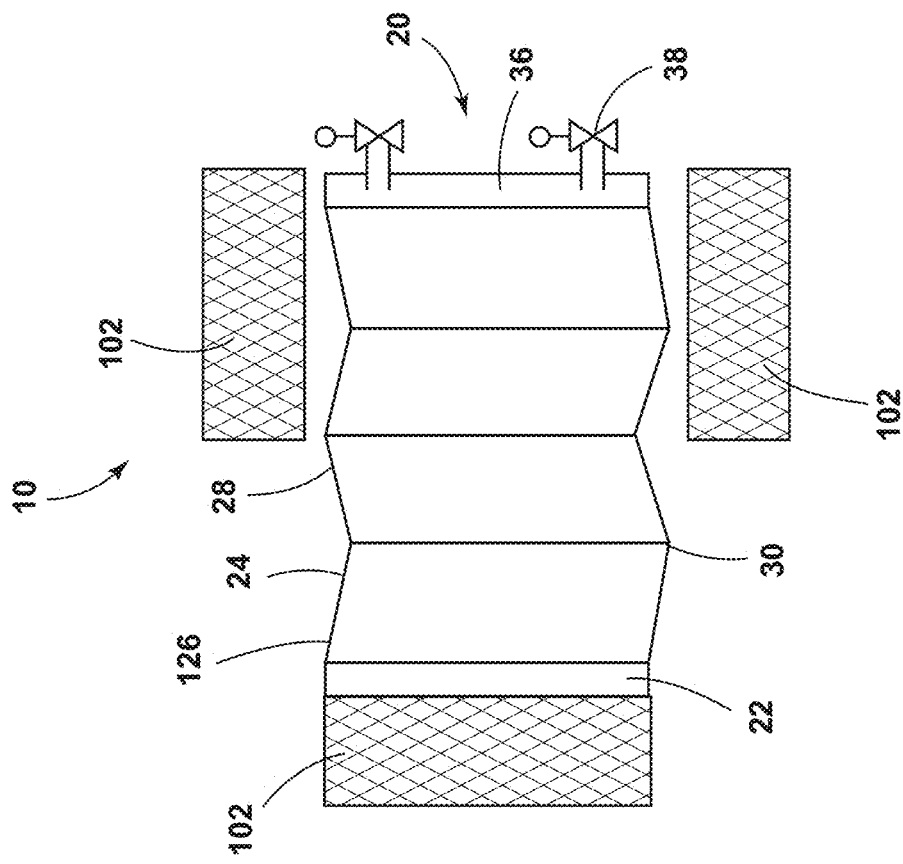
FIG. 13B is a schematic view of the articulation assembly of FIG. 13A in an extended condition and operably coupled to the trim article.
Figure 13A:
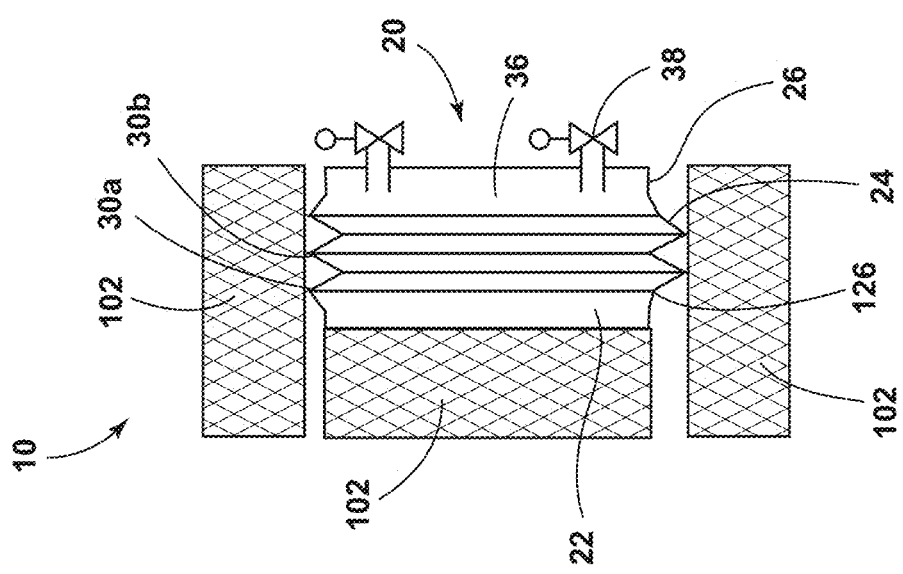
FIG. 13A is a schematic view of an articulation assembly of the present disclosure in a compressed condition and operably coupled to a trim article.
Figure 15:
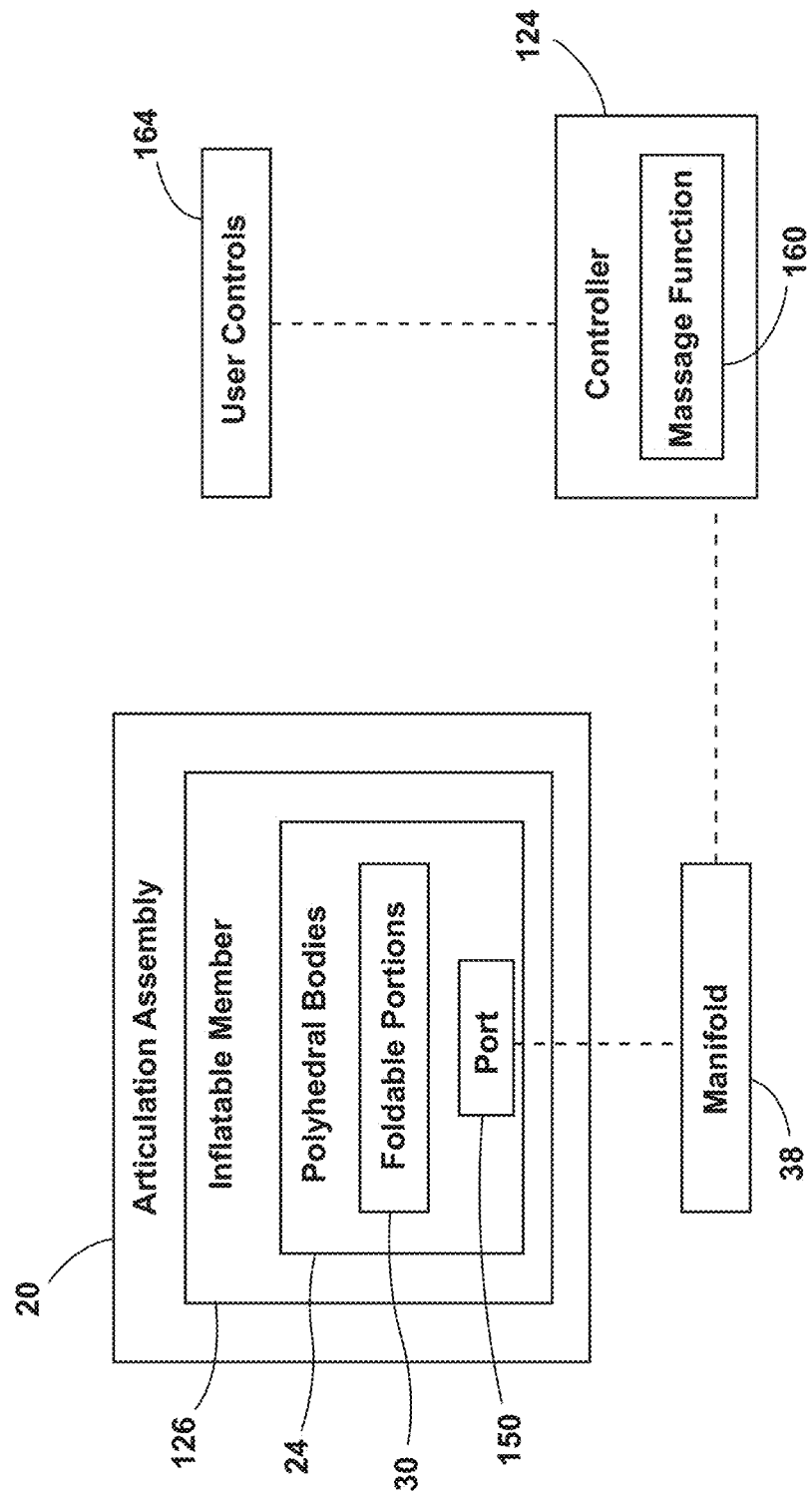
FIG. 15 is a schematic block diagram illustrating the connection between a controller, a manifold, and an articulation assembly of the present disclosure.

With specific reference to FIGS. 10 and 11, the inflatable member 126 is illustrated as having a zig-zag configuration. The first and second ends 128, 130 of the inflatable member 126 have four of the edges 134, and the first and second surface 136, 138 of each foldable portion 30 generally define a four-sided polygon. For example, the first and second surfaces 136, 138 of the foldable portions 30 define a quadrilateral configuration. The inflatable member 126 illustrated includes two polyhedral bodies 24 each being defined by four foldable portions 30. Additionally or alternatively, greater than two polyhedral bodies 24 may be used to form the inflatable member 126 in the depicted configuration. The number of polyhedral bodies 24 used to form the inflatable member 126 may depend on the location of the articulation assembly 20 in the seating assembly 10. For example, the positioning of the inflatable member 126 of the articulation assembly 20 in the upper support portion 94 of the seating assembly 10 may utilize less polyhedral bodies 24 to form the inflatable member 126. Additionally or alternatively, the placement of the inflatable member 126 within the central portion 100 of the seating assembly 10 may result in more polyhedral bodies 24 being used to form the inflatable member 126.

Referring now to FIGS. 6-15, the plurality of elastomeric members 34 can be operably coupled to the crease lines 32 defined by each of the polyhedral bodies 24, as mentioned above. It is generally contemplated that the elastomeric members 34 may generally outline or further define each of the foldable portions 30 of the polyhedral bodies 24. The elastomeric members 34 are generally configured from an elastomeric material such as silicone, rubber, and/or other practicable materials. It is generally contemplated that the elastomeric members 34 are configured to support or otherwise provide added stabilization for the inflatable member 126 in the extended condition 28 of the polyhedral bodies 24. As will be described in more detail below, the articulation assembly 20 is configured to apply a pressure P to an occupant positioned on the seating assembly 10, and the elastomeric members 34 can generally retain the geometric configuration of the inflatable member 126 while assisting in the overall rigidity and strength of the inflatable member 126 in the extended condition 28. The elastomeric members 34 may be disposed on the first end 128 and the second end 130 of the inflatable member 126 and can also be coupled to the planar engagement surface 22 and the planar base 36 of the articulation assembly 20.

It is generally contemplated that the planar base 36 is operably coupled to the seat frame 14 and includes a port 150 to which the manifold 38 is coupled. It is also contemplated that the planar engagement surface 22 and the planar base 36 may each include an attachment surface 152 that is coupled to the inflatable member 126 and each may define a void 154 to further assist in the general pliability and/or malleability of the articulation assembly 20. For example, each of the planar engagement surface 22 in the planar base 36 may include a pliable wall 156 that defines the void 154 and is configured to bend, flex, and otherwise adjust during the articulation of the articulation assembly 20. While the inflatable member 126 and the configuration of the polyhedral bodies 24 structurally define the articulation assembly 20 within the seating assembly 10, it is also contemplated that the pliable walls 156 of the planar engagement surface 22 and the planar base 36 may at least partially support and at least partially assist in the general movement of the articulation assembly 20.

Referring still to FIGS. 6-15, the pliable walls 156 may compress and extend depending on the condition of the inflatable member 126, such that the compression and extension of the pliable walls 156 may be generally force dependent. Additionally or alternatively, the pliable walls 156 may extend and compress depending on the pressure P applied to the occupant during use of the articulation assembly 20. For example, the planar engagement surface 22 may contract or otherwise be compressed via compression of the pliable walls 156 when the pressure P is applied to the occupant via the articulation assembly 20. The articulation of the articulation assembly 20 relative to the trim article 102 and/or the outer shell 16 defines a massage function 160 of the articulation assembly 20. During execution of the massage function 160, the inflatable member 126 may be in the extended condition 28, regardless of the potential compression or otherwise retraction of the pliable walls 156 of the planar engagement surface 22.

The void 154 defined by the planar base 36 is generally retained during the extended condition 28 of the inflatable member 126. The manifold 38 is operably coupled to the planar base 36 via the port 150 to translate a fluid from the manifold 38 into the void 154 defined by the planar base 36. Stated differently, the manifold 38 is fluidly coupled to the port 150 of the planar base 36 and is configured to translate the fluid to the inflatable member 126 via the port 150 to ultimately translate the polyhedral bodies 24 between the compressed condition 26 and the extended condition 28. The manifold 38 is also communicatively coupled to the controller 124 to selectively activate the articulation assembly 20. Stated differently, the controller 124 is communicatively and operably coupled to the articulation assembly via the manifold 38, such that the controller 124 is configured to activate and deactivate the articulation assembly 20. The occupant may select to activate the articulation assembly 20 via the controller 124, and the controller 124 can send a signal to the manifold 38 to dispense the fluid through the port 150 to the inflatable members 126.

With further reference to FIGS. 6-15, the controller 124 is configured to detect an angle of the seating assembly 10 and may activate and/or deactivate the articulation assembly 20 based on the detection of the angle of the seating assembly 10. For example, the controller 124 may detect that the seating assembly 10 is at an angle that is less than 45-degrees, and the occupant may utilize the articulation assembly 20 as a pillow feature 162. The controller 124 may activate the pillow feature 162 of the articulation assembly 20 once the seating assembly 10 has been adjusted to an angle beyond 45-degrees reclined. The controller 124 can then communicate with the manifold 38 to dispense the fluid into the cavity 132 defined by the inflatable member 126 to articulate at least one of the polyhedral bodies 24 to define the pillow feature 162.

It is generally contemplated that the occupant may utilize user controls 164 that are operably coupled to the controller 124 to program or otherwise automate the pillow feature 162 to articulate the inflatable member 126 to a preset condition. For example, the inflatable member 126 can also be defined in an intermediate condition 166 that is defined between the compressed condition 26 and the extended condition 28. It is generally contemplated that the first surface 136 may be adjacent to the second surface 138 in the intermediate condition 166 to define an acute angle between the first and second surfaces 136, 138. The preset or otherwise preprogrammed pillow feature 162 may result in the actuation of the articulation assembly 20, and the inflatable member 126 can be defined in the intermediate condition 166, such that the inflatable member 126 is partially extended. It is also contemplated that the occupant may adjust or otherwise manipulate the position or extension of the inflatable member 126 via the user controls 164 communicatively coupled to the controller 124. Based on the input received by the occupant, the controller 124 can communicate with the manifold 38 to translate additional fluid into the inflatable member 126 and/or release at least some of the fluid disposed within the cavity 132 defined by the inflatable member 126.

Referring still to FIGS. 6-15, it is also contemplated that the articulation assembly 20 may include a plurality of inflatable members 126 that each include a plurality of polyhedral bodies 24 and coupled to the manifold 38. In this additional or alternate configuration the plurality of inflatable members 126 are configured to extend and contract to define a massage pattern of the massage function 160 along the outer shell 16 of the seating assembly 10. In any one of the configurations illustrated above, the inflatable member 126 and the polyhedral bodies 24 are configured as an origami structure, such that each of the polyhedral bodies 24 are integrally formed as a monolithic structure configured to fold or otherwise compress, such that the inflatable member 126 is substantially flat in the compressed condition 26. It is generally contemplated that the origami structure of the inflatable members 126 may be formed from a polymeric material. The inflatable members 126 may also be formed from other practicable materials capable of compressing and extending and defining the various origami structures set forth above.

Referring again to FIGS. 1-15, the articulation assembly 20 is advantageously formed via additive manufacturing, such that the inflatable member 126 of the articulation assembly 20 is a monolithic structure. The formation via additive manufacturing defines the origami structure of the inflatable member 126 and each of the polyhedral bodies 24. The overall configuration being formed via additive manufacturing provides addition structural integrity and strength to the origami structure of the articulation assembly 20. The optional addition of the elastomeric members 34 may further stabilize and support the inflatable member 126. It is generally contemplated that the elastomeric members 34 may be separate features added after the additive manufacturing of the inflatable member 126. Additionally or alternatively, the elastomeric members 34 may be formed and added to the crease lines 32 of the inflatable member 126 during the additive manufacturing process.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle, comprising:
   a seat frame;
   an outer shell coupled to the seat frame and defining a space therebetween;
   an articulation assembly disposed within the space defined between the seat frame and the outer shell, the articulation assembly including:
   a planar engagement surface selectively engaged with the outer shell;
   at least one polyhedral body is operably coupled to the planar engagement surface and operable between a compressed condition and an extended condition, the polyhedral body including a plurality of foldable portions that define crease lines;
   a plurality of elastomeric members disposed along the crease lines defined by each of the plurality of foldable portions; and
   a planar base operably coupled to the polyhedral body; and
   a manifold coupled to the planar base and configured to translate a fluid to the polyhedral body.

2. The seating assembly of claim 1, wherein the plurality of foldable portions each include a first surface and a second surface, and wherein the first surface is selectively coupled to the second surface in the compressed condition of the polyhedron bodies.

3. The seating assembly of claim 1, wherein the at least one polyhedral body is configured to be formed via additive manufacturing.

4. The seating assembly of claim 1, further comprising:
   a controller communicatively and operably coupled to the articulation assembly via the manifold, wherein the controller is configured to activate and deactivate the articulation assembly.

5. The seating assembly of claim 1, wherein the plurality of foldable portions include a first foldable portion and a second foldable portion, and wherein the first foldable portion is selectively coupled to the second foldable portion in the compressed condition of the polyhedral body.

6. The seating assembly of claim 1, wherein the articulation assembly further includes an inflatable member comprised of the polyhedral body, wherein the inflatable member includes a first end and a second end.

7. The seating assembly of claim 6, wherein the first end of the inflatable member is adjacent the second end in the compressed condition, and wherein the inflatable member is substantially flat in the compressed condition.

8. An articulation assembly for a vehicle seat, comprising:
   a planar engagement surface;
   an inflatable member operably coupled to the planar engagement surface, the inflatable member including:
   a plurality of polyhedral bodies having a foldable portion that defines crease lines; and
   a plurality of elastomeric members disposed on each of the crease lines;
   a planar base including a port fluidly coupled to the polyhedral bodies; and
   a manifold fluidly coupled to the port of the planar base and configured to translate fluid through the port to the polyhedral bodies.

9. The articulation assembly of claim 8, wherein the polyhedral bodies are configured to translate between a compressed condition and an extended condition.

10. The articulation assembly of claim 9, wherein the manifold is operably coupled to the polyhedral bodies via the port of the planar base, and wherein the fluid translated by the manifold is configured to translate the polyhedral bodies from the compressed condition to the extended condition.

11. The articulation assembly of claim 9, wherein the foldable portion of each of the polyhedral bodies includes a first surface and a second surface, and wherein the first surface is selectively coupled to the second surface in the compressed condition of the polyhedral bodies.

12. The articulation assembly of claim 11, wherein an intermediate condition is defined between the compressed condition and the extended condition, and wherein the first surface is adjacent to the second surface in the intermediate condition to define an acute angle between the first surface and the second surface.

13. The articulation assembly of claim 8, wherein the inflatable member is configured to be formed via additive manufacturing.

14. A vehicle seat assembly, comprising:
a seat base;
a shell coupled to the seat base and defining a space between the seat base and the shell;
a planar engagement surface selectively coupled with the shell;
a polyhedral body having a first end and a second end operably coupled to the planar engagement surface on the first end, the polyhedral body defining a cavity and having a plurality of foldable portions, wherein each of the plurality of foldable portions includes a first surface and a second surface defined by a plurality of crease lines, wherein the first surface and the second surface of each of the plurality of foldable portions each comprise a triangular shape; and
a planar base operably coupled to the second end of the polyhedral body and including a port configured to translate the polyhedral body between a compressed condition and an extended condition.

15. The vehicle seat assembly of claim 14, further comprising:
an inflatable member comprised of the polyhedral body and further defining the cavity of the polyhedral body; and
a manifold fluidly coupled to the port of the planar base and configured to translate a fluid to the inflatable member via the port to translate the polyhedral body between the compressed condition and the extended condition.

16. The vehicle seat assembly of claim 14, wherein the polyhedral body includes a plurality of elastomeric members operably coupled to the plurality of crease lines of each of the plurality of foldable portions.

17. The vehicle seat assembly of claim 14, wherein the first surface of a first foldable portion is selectively coupled to the second surface of the first foldable portion in the compressed condition of the polyhedral body.

18. The vehicle seat assembly of claim 14, wherein the first surface and the second surface of each of the plurality of foldable portions define a living hinge operable between the compressed condition and the extended condition of the polyhedral body.

19. The vehicle seat assembly of claim 14, wherein the polyhedral body comprises an origami structure.

* * * * *